United States Patent [19]

Nishimura et al.

[11] Patent Number: 4,912,479
[45] Date of Patent: Mar. 27, 1990

[54] MICROWAVE LANDING SYSTEM

[75] Inventors: Takashi Nishimura; Taksukichi Koshio, both of Tokyo, Japan

[73] Assignee: NEC Corporation, Tokyo, Japan

[21] Appl. No.: 341,286

[22] Filed: Apr. 21, 1989

Related U.S. Application Data

[63] Continuation of Ser. No. 29,906, Mar. 25, 1987, abandoned.

[30] Foreign Application Priority Data

Mar. 26, 1986 [JP] Japan .................................. 61-69286
Mar. 26, 1986 [JP] Japan .................................. 61-69687

[51] Int. Cl.⁴ .............................................. G01S 4/16
[52] U.S. Cl. ...................................... 342/408; 342/35;
342/410; 342/421; 342/413
[58] Field of Search ................ 342/35, 410, 411, 412,
342/421, 413, 368, 408

[56] References Cited

U.S. PATENT DOCUMENTS

| | | | |
|---|---|---|---|
| 3,234,554 | 2/1966 | Earp et al. | 342/408 |
| 3,409,890 | 11/1968 | Redlich | 342/410 |
| 3,716,863 | 2/1973 | Ghose et al. | 342/410 |
| 3,836,978 | 9/1974 | Overbury | 342/408 |
| 3,964,067 | 6/1976 | Lucas | 342/410 |
| 4,164,743 | 8/1979 | Lucas et al. | 342/410 |
| 4,167,739 | 9/1979 | Lucas et al. | 342/410 |
| 4,178,581 | 12/1979 | Willey, Sr. | 342/368 |
| 4,306,238 | 12/1981 | Enein | 342/408 |
| 4,306,239 | 12/1981 | Enein | 342/408 |
| 4,484,196 | 11/1984 | Lucas et al. | 342/404 |
| 4,485,384 | 11/1984 | Connor | 342/408 |
| 4,635,064 | 1/1987 | Chisholm | 342/408 |
| 4,667,201 | 5/1987 | Itoh | 342/368 |

OTHER PUBLICATIONS

*Multipath Error Correction*, Cafarelli et al., ATCA Fall Conference Proceedings, 11/2/86.

Primary Examiner—Thomas H. Tarcza
Assistant Examiner—David Cain
Attorney, Agent, or Firm—Foley & Lardner, Schwartz, Jeffery, Schwaab, Mack, Blumenthal & Evans

[57] ABSTRACT

There is disclosed a microwave landing system wherein there are provided at least two means which are spaced by a predetermined distance and from two of which beams radiate alternately to scan a predetermined region vertically and horizontally. In the microwave landing system, multipath propagating beams due to the scanning beams or side-lobes thereof are of out of phase or in non-correlation with each other in a receiving means in an aircraft to suppress multipath errors.

7 Claims, 9 Drawing Sheets

TRANSMITTER OUTPUT

Fig. 3D time

MICROWAVE LANDING SYSTEM

This application is a continuation of application Ser. No. 07/029,906, filed Mar. 25, 1987 now abandoned.

FIELD OF THE INVENTION

The invention relates to a microwave landing system, and more particularly to a microwave landing system in which multipath errors are canceled whereby precision approach and landing of an aircraft can be performed.

BACKGROUND OF THE INVENTION

There has been practically used a microwave landing system (simply called "MLS" hereinafter) which includes an azimuth station scanning in the horizontal plane and an elevation station scanning in the vertical plane. In the MLS, the coverage region is generally 40 degrees respectively on both left and right sides in regard to the center line for azimuth and 0.9 to 20 or 30 degrees for elevation. The scanning beam is narrow in the direction of scan, typically 1 to 3 degrees for azimuth and 1 to 2 degrees for elevation.

In operation, the beam is scanned in the coverage region from one scan limit to the other and then back. That is to say, the horizontal region is covered by the beam which scans from the left scan limit to the right scan limit (called "TO scanning") and then back to the left scan limit from the right scan limit (called "FRO scanning"), while the vertical region is covered by the beam which scans from the lowest elevation limit to the highest elevation limit (called "TO scanning") and then back to the lowest elevation limit from the highest elevation limit (called "FRO scanning"). During each scan cycle, an aircraft receives TO and FRO pulses in accordance with the TO and FRO scannings a time interval between which is in response to a position in the air at which the aircraft is flying to make a landing on a runway so that the measurement of the time interval provides the information of angles for azimuth and elevation. The MLS as mentioned above is referred to as Time Reference Scanning Beam System (TRSB) which is well known in the art, while the details thereof are described later.

According to the MLS, however, there occurs multipath propagating beams in accordance with the reflection of the scanning beam or sidelobes thereof on the ground or reflecting medium like buildings etc. This results in multipath errors in the measurement of a time interval between the TO and FRO pulses. In order to reduce the multipath errors, an aperture of an antenna must be enlarged. In addition, such hardwares as radiating elements, phase shifter, transmitting line etc. are difficult to be manufactured because they are required to have a predetermined quality. Further, high frequency circuits of complicated construction are necessary to be added for forming a spatial filter.

SUMMARY OF THE INVENTION

Accordingly, it is an object of the invention to provide MLS in which multipath errors are canceled whereby precision approach and landing of an aircraft can be performed.

It is a further object of the invention to provide MLS in which such hardwares as an antenna etc. can be avoided to be enlarged and become complicated in its construction in cancelling the multipath errors.

According to the invention, MLS comprises at least two means which are positioned to be spaced by a predetermined distance and from two of which beams radiate alternately to scan a predetermined region horizontally and vertically whereby multipath propagating beams due to the reflection of said beams or sidelobes thereof on the ground or reflecting medium are of reverse-phase or non-correlation with each other in a receiving means in aircraft to suppress multipath errors.

BRIEF DESCRIPTION OF THE DRAWINGS

The invention will be explained in more detail in accordance with following drawings wherein.

DESCRIPTION OF THE PREFERRED EMBODIMENT

Figure 1:
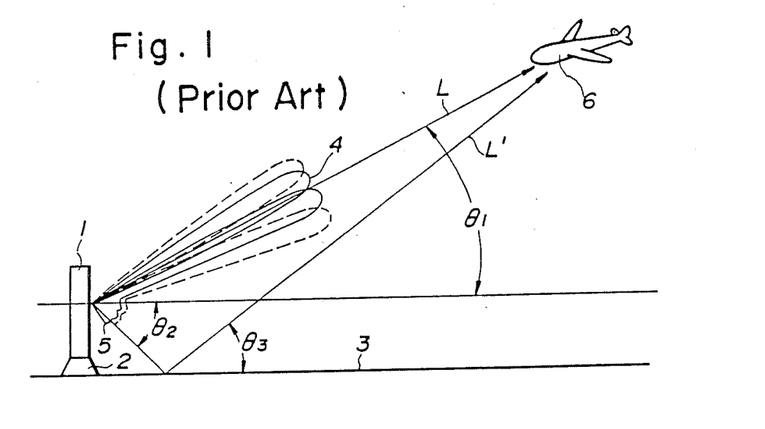
FIG. 1 is an explanatory view illustrating a conventional MLS.
Figure 2A:
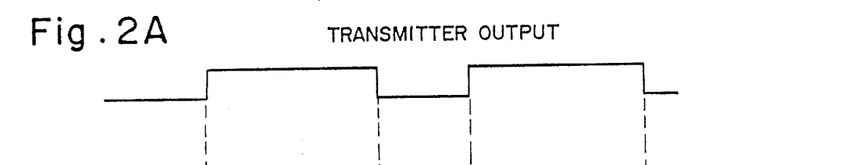
FIGS. 2A to 2C are timing charts showing operation of the conventional MLS.
Figure 2B:
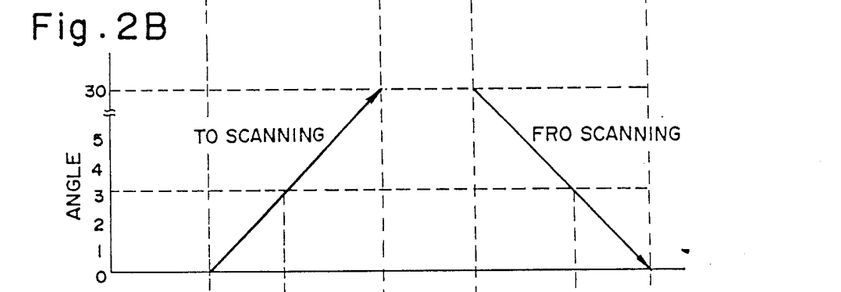
Figure 2C:
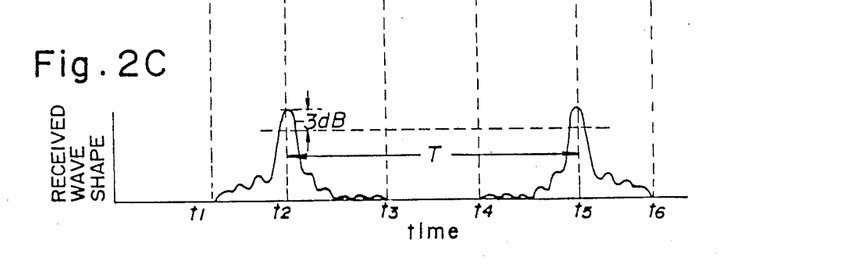

Before describing an embodiment according to the invention, a conventional MLS will be explained in more detail. In FIG. 1, an antenna 1 is positioned at a predetermined distance from the entry point of a runway 3 to be provided on an antenna base 2. When the antenna 1 is driven as shown in FIG. 2A, beams 4 each having the beam width as relatively narrow as 1 to 2 degrees radiate therefrom so that the vertical coverage region is scanned from the lowest elevation limit to the highest elevation limit at time $t_1$ to $t_3$, for instance, 0.9 to 20 or 30 degrees (TO SCANNING) and then back to the lowest elevation limit (FRO SCANNING) at time $t_4$ to $t_6$ as shown in FIG. 2B. An aircraft 6 flying in the air to make a landing on a runway receives TO pulse and FRO pulse respectively to be produced at time $t_2$ and $t_5$ in accordance with a threshold level 3 dB below beam peak as shown in FIG. 2C. In the aircraft 6, a time interval T between the centers of the TO and FRO pulses, in other words, from time $t_2$ to $t_5$ is calculated so that an angle with which the aircraft 6 is approaching the runway 3 can be detected to be 3 degrees in accordance with the relation in FIG. 2B. That is to say, the direct beam L is received with elevation $\theta_1 (\theta_1 = 3°)$ to produce TO and FRO pulses in the aircraft 6.

Figure 3A:
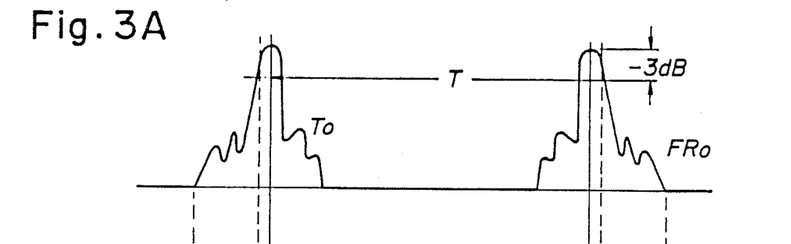
FIGS. 3A to 3D are timing charts showing multipath errors in the conventional MLS.
Figure 3B:
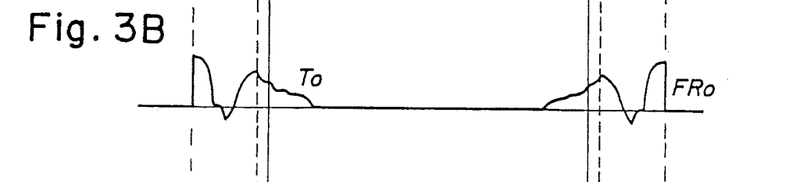
Figure 3C:
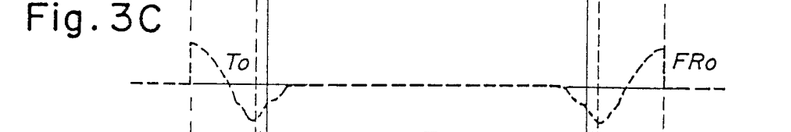

In addition, the indirect beam L' is produced due to the reflection of scanning beams or sidelobes thereof on the ground wherein the radiating and reflecting angles $\theta_2$ and $\theta_3$ of the indirect beam L' are approximately $-\theta_1$ and $\theta_1$ respectively. As a result, the indirect beam L' is received in the aircraft 6 as shown in FIGS. 3B and 3C wherein FIG. 3B shows the indirect beam of the same phase as the main beam while FIG. 3C shows the indirect beam out of phase in regard to the main beam. If the indirect beam L' of the same phase is added to the direct beam L FIG. 3A, the synthesized wave of (solid line in FIG. 3D) is obtained to have a time interval $T+\alpha$ between TO and FRO pulses. On the other hand, if the out of phase indirect beam L' is added thereto, the synthesized wave (dotted line in FIG. 3D) is obtained to have a time interval $T-\beta$ therebetween. The value $\alpha$ or $\beta$ is a multipath error which is considered to be a disadvantage in the conventional MLS.

Figure 4:
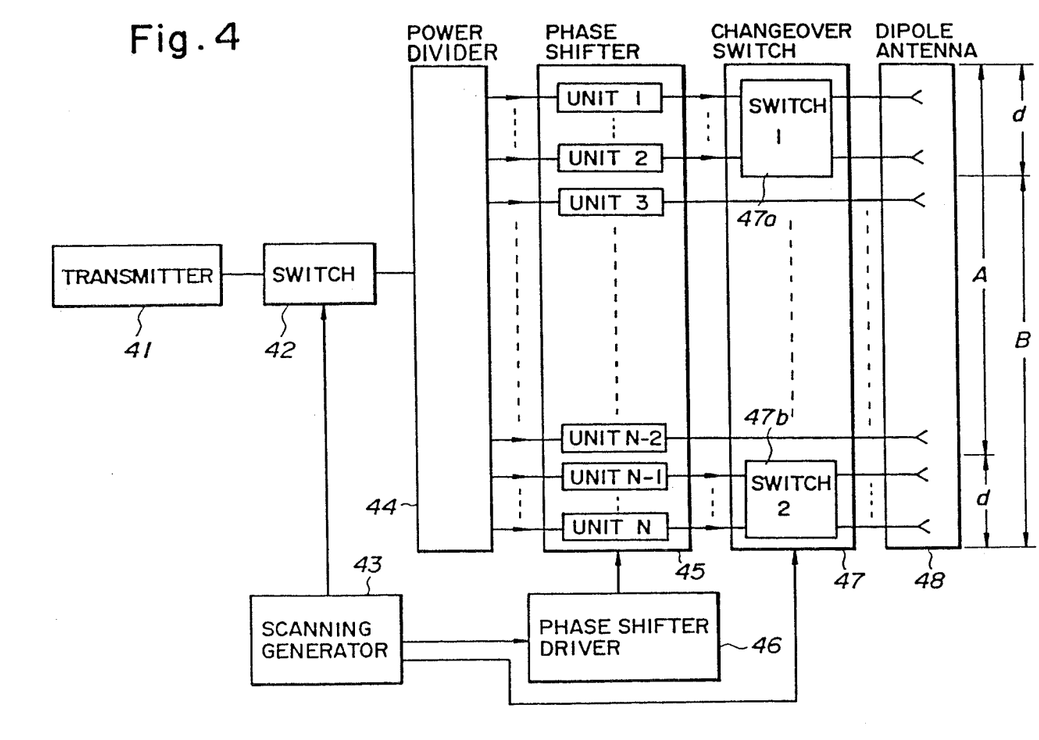
FIG. 4 is a block diagram showing the first embodiment according to the invention.

In FIG. 4, there is shown MLS in the first embodiment according to the invention which guides an aircraft vertically and comprises a transmitter 41 producing a predetermined form and level of transmitting power (for instance, f=5 GHz), a switch 42 through which transmitting power is passed or shut off in accordance with scanning signals to be generated in the scanning generator 43, a power divider 44 dividing the transmitting power passed through the switch 42, for instance, in Taylor distribution or equal distribution into a predetermined number of outputs, a phase shifter 45 including the predetermined number of phase shifter units 1 to N each to be driven with the respective predetermined phase shift amounts by a phase shifter driver 46 into which four bit shift data are input and which is controlled in accordance with the scanning signals of the scanning generator 43, a changeover switch 47 including two switch units 47a and 47b alternately to be turned on in accordance with the signals of the scanning generator 43, and dipole antenna arrays 48 from which beams radiate to scan a coverage region.

Figure 5:
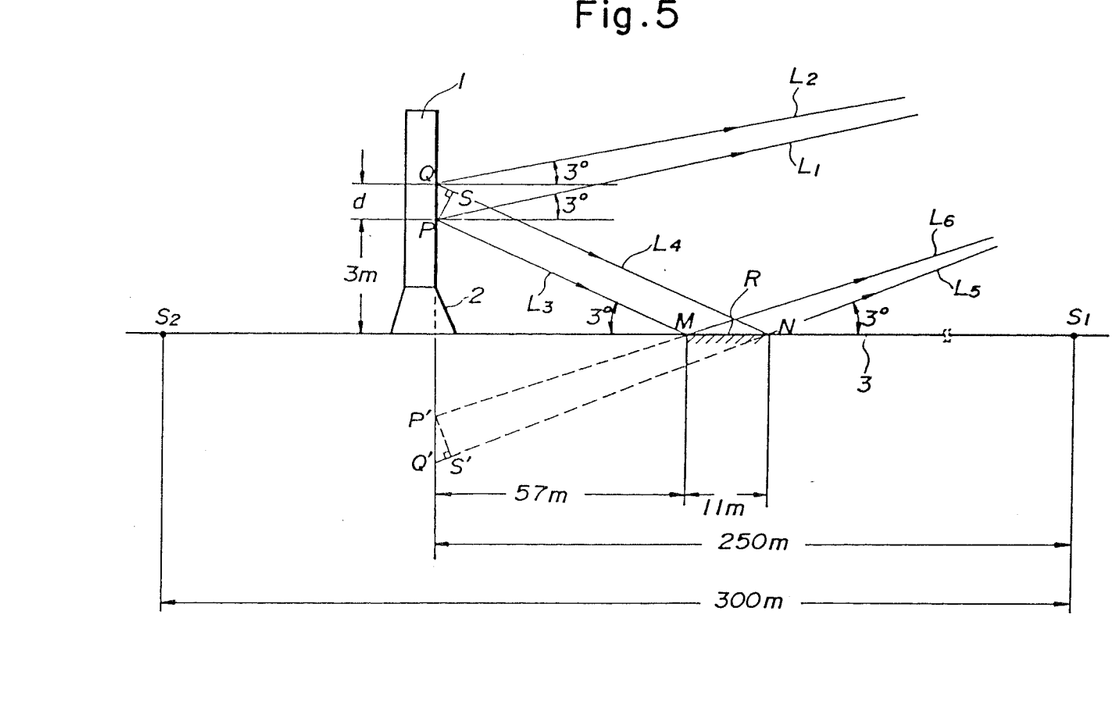
FIG. 5 is an explanatory view explaining operation of the first embodiment according to the invention.

In FIG. 5, an antenna 1 is composed of the dipole antenna arrays 48 (FIG. 4) and is positioned at the distance of 250 m from the entry point $S_1$ of a runway 3 to be provided on an antenna base 2. The antenna 1 is structured to have two centers P and Q of radiation which become alternately active by the alternate turning on of the switch units 47a and 47b in the changeover switch 47. The center P of radiation is positioned 3 m above the ground and there is provided a distance d (for instance, d=57 cm) between the centers P and Q of radiation.

In operation, an aircraft (not shown) is flying several thousands meters in the air from the landing spot $S_2$ to approach the runway 3 with the descending angle 3° and to make a landing on the spot $S_2$ of 300 m from the entry point $S_1$ thereof.

Transmitting power is passed through the switch 42 to be turned on from the transmitter 41 to the power divider 44 in which the transmitting power is divided into the phase shifter units 1 to N of the phase shifter 45. In the phase shifter 45, the phase shifter units 1 to N provide the respective transmitting powers passing therethrough with different phase shifts determined in accordance with a radiated beam direction from the dipole antenna 48. The transmitting powers which are phase-shifted with respective angles are input to the first section A of the dipole antenna arrays 48 in accordance with the turning on of the switch unit 47a in the changeover switch 47. As a result, beams radiate from the radiating center P of the antenna 1. After one cycle in which the beams radiate from the first section of the antenna, the beams radiate from the second section B thereof in the same manner. In the embodiment, the beams radiating alternately from the first and second sections from the antenna 1 scan, for instance, 40 cycles/sec vertically to cover a specific region ranging from 0.9 to 20 or 30 degrees in regard to the horizontal line by adjusting the respective phase shifts at the phase shifter 45 in each scanning cycle. In this occasion, the beams $L_1$ and $L_2$ of 3 degrees are received in the aircraft directly, while parts of the beams $L_3$ and $L_4$ of approximately $-3$ degrees which radiate in accordance with sidelobes of the main beam are received therein indirectly as the beams $L_5$ and $L_6$ reflected on the ground R. As clearly understood from the illustration in FIG. 5, the difference $\Delta d$ of propagating distances between the beams $L_5$ and $L_6$ is calculated in a triangle $\Delta PQS$ in accordance with the equation (1).

$$d = \Delta d / \sin \theta \qquad (1)$$

In the embodiment, d is the distance between the radiating centers P and Q of the antenna 1 (d=57 cm) and $\theta$ is the descending angle of the aircraft ($\theta = 3°$) so that the propagating distance difference $\Delta d$ of the beams $L_5$ and $L_6$ is approximately 3 cm. Accordingly, the wavelength $\lambda (\lambda = 6$ cm$)$ is selected to meet the equation (2) so that the beams $L_5$ and $L_6$ are received to be of out of phase in the aircraft.

$$\Delta d = \frac{\lambda}{2} = 3 \text{ cm} \qquad (2)$$

Figure 6:
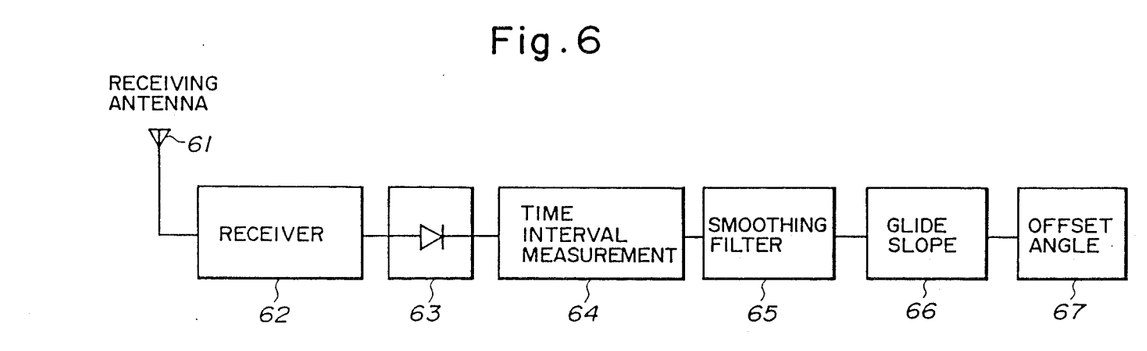
FIG. 6 is a block diagram showing an apparatus for calculating a time interval between TO and FRO pulses in an aircraft.

FIG. 6 shows apparatus in the aircraft for receiving beams radiating from the antenna 1 which comprises a receiver 62 with an antenna 61 receiving the direct beams $L_1$ and $L_2$ and the indirect beams $L_5$ and $L_6$, a circuit 63 rectifying outputs of the receiver 62, a circuit 64 measuring a time interval T between TO and FRO pulses as mentioned before, a smoothing filter circuit 65 outputting mean value of the time interval values serially to be input thereinto, a circuit 66 calculating a glide slope $\theta$ in accordance with the following equation (3), and a circuit 67 calculating an offset angle by which the calculated glide slope $\theta$ deviates from a predetermined angle to indicate it for pilots in the aircraft.

$$\theta = K(T_o - T) \qquad (3)$$

where K is constant and $T_0$ is a predetermined time between the beginning of TO scanning and the end of FRO scanning.

Figure 3D:
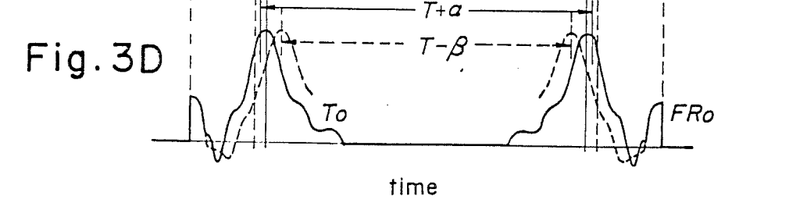

In operation, the direct and indirect beams $L_1$ and $L_6$, and $L_2$ and $L_5$ are received through the antenna 61 in the receiver 62 alternately in 40 cycles/sec. The time interval measuring circuit 68 produces a time interval signal T in each cycle in accordance with the direct beams $L_1$ and $L_2$ as previously shown in FIG. 3A, and time interval signals $T+\alpha$ and $T-\beta$ in each cycle in accordance with the indirect beams $L_5$ and $L_6$ as shown in FIGS. 3B and 3D. The smoothing filter circuit 65 produces mean time interval value T in which errors $\alpha$ and $\beta$ are diminished to be substantially zero in accordance with the time interval signals T, $T+\alpha$ and $T-\beta$ since the propagating distance difference $\Delta d$ of the indirect beams $L_5$ and $L_6$ is a half wavelength $(\lambda/2)$ so that the indirect beams $L_5$ and $L_6$ are received out of phase whereby the error $\alpha$ is substantially made equal to the error $\beta$. As a result, the glide slope angle $\theta(\theta = 3°)$ can be detected without being affected by multipath errors in the glide slope circuit 66 so that the pilots in the aircraft can know an offset angle in the offset angle circuit 67.

Although clearly illustrated in FIG. 5, a triangle ΔP'Q'S' is a mirror image of the triangle ΔPQS, the length MN of the ground R on which the indirect beams L$_5$ and L$_6$ are reflected is 11 m, and there is a distance 57 m between the one end M of reflecting ground R and the point on which the antenna 1 is positioned.

In regard to an antenna for guiding an aircraft vertically, the effective aperture D thereof is easily determined in accordance with the equation (4).

$$\phi \approx 70 \cdot \lambda / D \qquad (4)$$

where $\phi$ is a half-power width of a beam.

Normally, the angle $\phi$ is 1.5 degrees so that the effective aperture D is 2.76 m, provided that power is supplied to the antenna in Taylor distribution wherein the power is maximum at the radiating center thereof and decreased symmetrically therefrom to upper and lower portions. Further, the antenna is not required to be higher since the dimension d between the two radiating centers P and Q is small, for instance, 57 cm in the embodiment as compared to the aperture of an antenna.

On the other hand, power may be supplied to an antenna in equal distribution. In such a case, the antenna aperture is decreased down to three fourth that of the Taylor distribution. That is to say, the aperture is 2.07 m (2.76 m × ¾) to remain the same as the conventional one even if the dimension d is added in the invention. Further, although sidelobes are increased in equal distribution by −13 dB as compared to −20 to −23 dB in the Taylor distribution, the improvement is attained in regard to errors of an aircraft glide slope by more than 10 dB so that the antenna aperture is not required to be enlarged.

Figure 7:
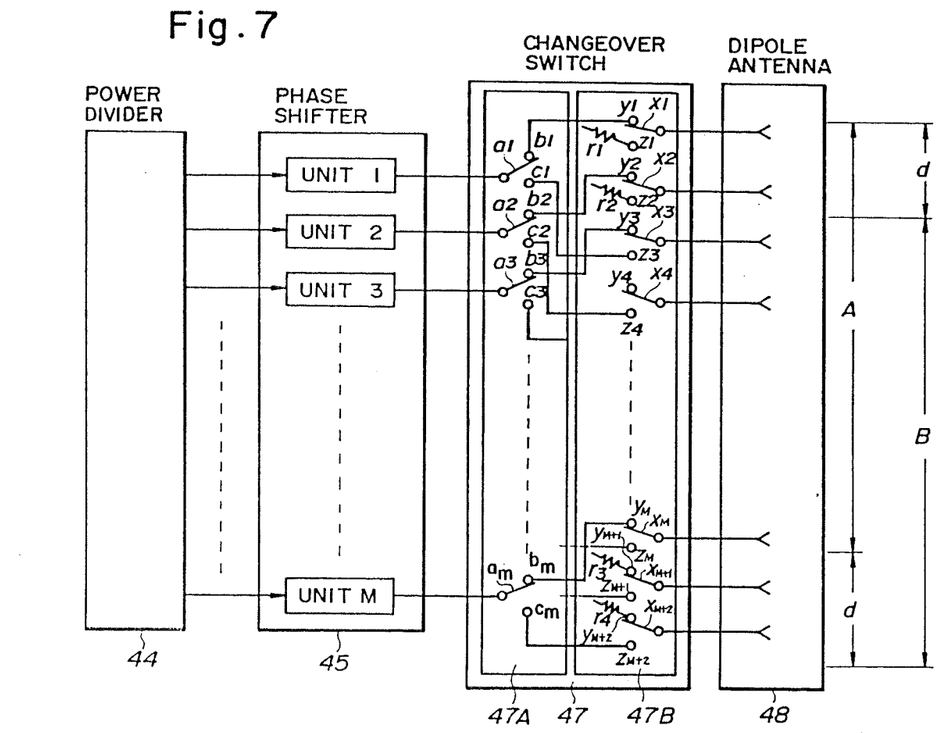
FIG. 7 is a block diagram showing the second embodiment according to the invention.

In FIG. 7, there is shown MLS in the second embodiment according to the invention which guides an aircraft vertically wherein like reference numerals and symbols indicate like parts in FIG. 4 except that a phase shifter 45 includes phase shifter units 1 to M and a changeover switch 47 includes the first and second switches 47A and 47B. The first switch 47A includes moving contacts a$_1$, a$_2$ - - - a$_M$ and fixed contacts b$_1$, b$_2$ - - - b$_M$ and c$_1$, c$_2$ - - - c$_M$, while the second switch 47B includes moving contacts x$_1$, x$_2$ - - - x$_{M+2}$ and fixed contacts y$_1$, y$_2$ - - - y$_{M+2}$ and z$_1$, z$_2$ - - - z$_{M+2}$. Between the first and second switches 47A and 47B, the fixed contacts b$_1$, b$_2$ - - - b$_M$ are connected to the fixed contacts y$_1$, y$_2$ - - - y$_M$ and the fixed contacts c$_1$, c$_2$ - - - c$_M$ to the fixed contacts z$_3$, z$_4$ - - - z$_{M+2}$ respectively, while the fixed contacts z$_1$ and z$_2$, and y$_{M+1}$ and y$_{M+2}$ are connected respectively to damper resistances r$_1$, r$_2$, r$_3$ and r$_4$ suppressing the influence of transmitting voltage to the adjacent channel when switched.

In operation, if the moving contacts a$_1$, a$_2$ - - - a$_M$ are connected to the fixed contacts b$_1$, b$_2$ - - - b$_M$ respectively and the moving contacts x$_1$, x$_2$ - - - x$_{M+2}$ are connected to the fixed contacts y$_1$, y$_2$ - - - y$_{M+2}$ respectively, beams radiate from the first section A of the dipole antenna arrays 48. On the other hand, if the moving contacts a$_1$, a$_2$ - - - a$_M$ are connected to the fixed contacts c$_1$, c$_2$ - - - c$_M$ respectively and the moving contacts x$_1$, x$_2$ - - - x$_{M+2}$ are connected to the fixed contacts y$_1$, y$_2$ - - - y$_{M+2}$, beams radiate from the second section B of the dipole antenna arrays 48.

Figure 8:
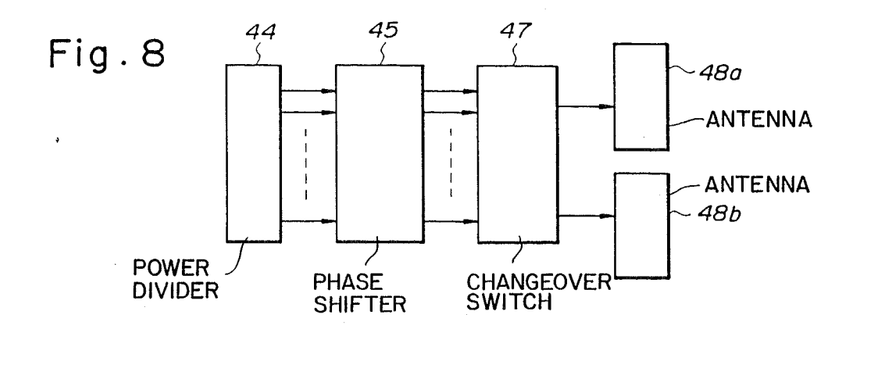
FIG. 8 is a block diagram showing the third embodiment according to the invention.

In FIG. 8, there is shown MLS in the third embodiment according to the invention which guides an aircraft vertically wherein like reference numerals indicate like parts in FIG. 4 except that there are provided two antennas 48a and 48b each having dipole antenna arrays and being positioned to have the difference d as mentioned before in height and separated to avoid the mutual influence by a predetermined distance. The two antennas 48a and 48b can be structured in a single body.

In operation, the antenna 48a and 48b are alternately driven in accordance with the selection in the changeover switch 47.

In the first to third embodiment, although multipath errors are avoided in accordance with the difference Δd(λ/2) of indirect beam propagating distances such that indirect beams are received in the aircraft to be out of phase, the indirect beams may be received therein to be in non-correlation with each other. The non-correlation may be attained by turning on and off more than two sets of dipole antenna arrays. Especially, dipole antennas may be turned on one by one in the first embodiment, if power is divided in equal distribution.

The non-correlation may be also attained by providing such differences as ¾λ, 2/4λ, ¼λ and standard condition etc. in propagating distances in accordance with the use of whole dipole antennas, although the equal number of dipole antennas are alternately turned on and off in the upper and lower sections. Further, although the aircraft is approaching to the runway with glide slope 3° in the first embodiment, there will be decreased multipath errors where a glide slope is more than 3° because sidelobes become smaller.

Figure 9:
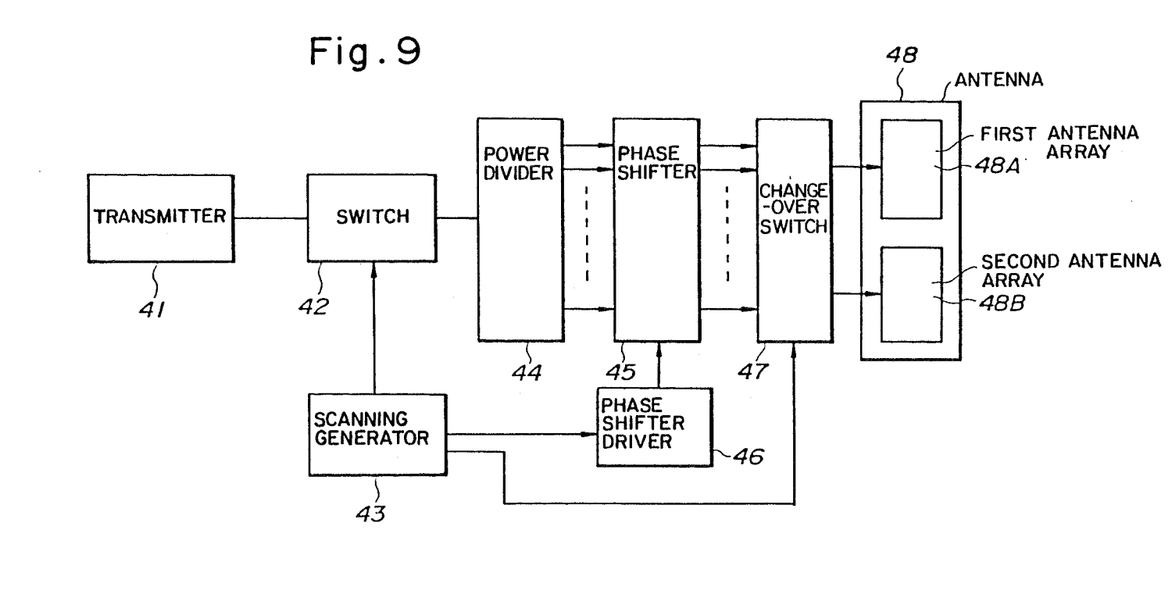
FIG. 9 is a block diagram showing the fourth embodiment according to the invention.

In FIG. 9, there is shown MLS in the fourth embodiment according to the invention in which azimuth multipath errors are canceled and which comprises a transmitter 41, a switch 42, a scanning generator 43, a power divider 44, a phase shifter 45, a phase shifter driver 46, a changeover switch 47, and an antenna 48 including the first antenna arrays 48A and the second antenna arrays 48B. The first and second antenna arrays 48A and 48B are positioned with a distance d therebetween as described in more detail later.

Figure 10:
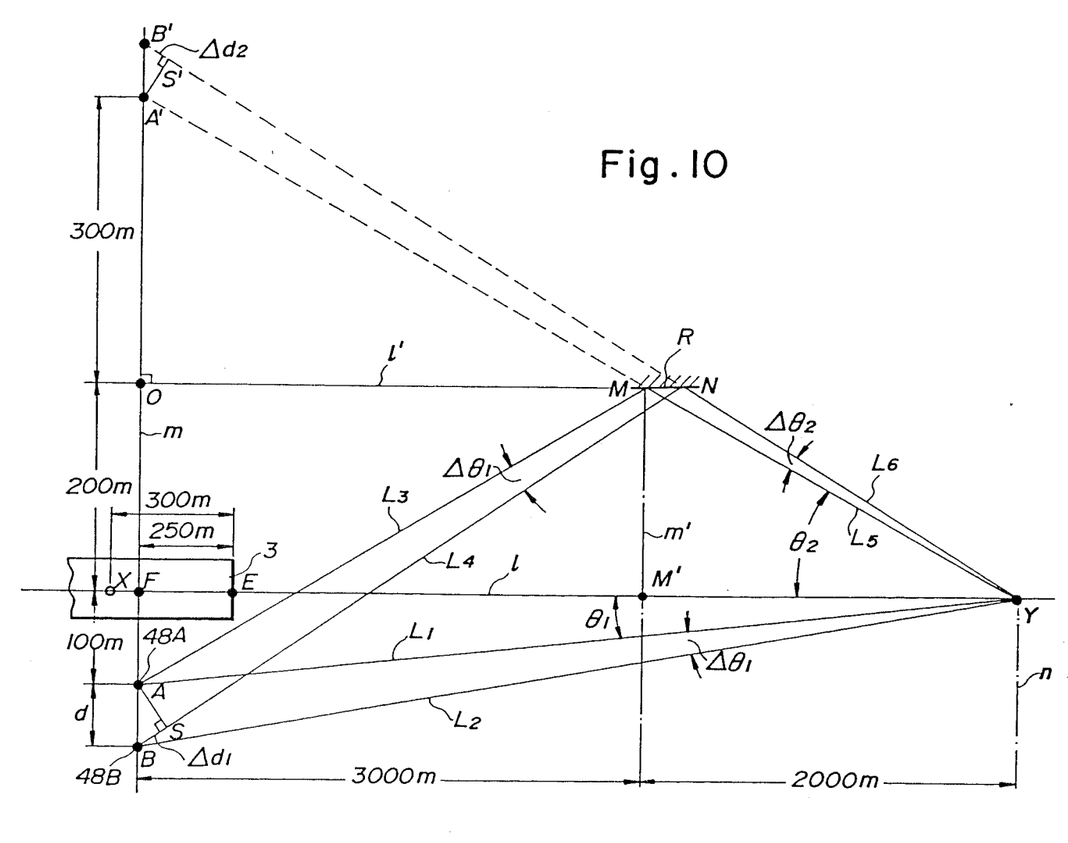
FIG. 10 is an explanatory view showing operation of the fourth embodiment according to the invention.

In FIG. 10, there is shown a geometric relation in which there is positioned a runway 3 having an entry end E on a line 1 while the first and second antenna arrays 48A and 48B are provided to be spaced by a distance d at points A and B on a line m crossing the runway 3 at a standard point F. An aircraft (not shown) is flying at a point Y in the air to make a landing on a spot X of the runway 3, while a reflecting medium R like a building is positioned along line 1' crossing the line m at a point O parallel to the line 1. Beams L$_3$ and L$_4$ radiating from the antenna arrays 48A and 48B are reflected on a surface M to N of the reflecting medium R. A line m' parallel to the line m crosses the lines 1' and 1 at the points M and M', and a line n crosses the line 1 at the point Y. A point S is marked on the beam L$_4$ to form an orthogonal triangle ΔABS, while a mirror image of ΔABS is illustrated as ΔA'B'S' in regard to the line 1'. In the illustration in FIG. 10, each dimension is as follows.

(1) $\overline{EF}$ = 250 m
(2) $\overline{EX}$ = 300 m
(3) $\overline{FA}$ = 100 m
(4) $\overline{FO}$ = 200 m
(5) $\overline{OA'}$ = 300 m
(6) $\overline{OM}$ = 3000 m
(7) $\overline{M'Y}$ = 2000 m On the other hand, respective angles $\theta_1$, $\theta_2$, $\Delta\theta_1$ and $\Delta\theta_2$, and the dimensions $\Delta d_1$ and $\Delta d_2$ in the orthogonal triangles $\Delta ABS$ and $\Delta A'B'S'$ are not explained herein because they are self-explanatory in FIG. 10.

In the geometric relation mentioned above, the distance d is calculated to cancel multipath errors in accordance with the following equation (5) to (11).

$$\theta_1 \approx \tan^{-1}\frac{100}{5000} = 1.15° \quad (5)$$

$$\theta_2 = \tan^{-1}\frac{200}{2000} = 5.73° \quad (6)$$

$$\Delta d_1 \approx d\sin\theta_1 = 0.02d \quad (7)$$

$$\Delta d_2 \approx d\sin\theta_2 = 0.1d \quad (8)$$

As clearly understood from the illustration in FIG. 10, the mutipath difference $\Delta d$ of propagating distances in the indirect beams $L_5$ and $L_6$ due to the reflection of the beams $L_3$ and $L_4$ radiating from the antenna arrays 48A and 48B is calculated as follows.

$$\begin{aligned}\Delta d &\approx \Delta d_2 - \Delta d_1 \\ &\approx d(\sin\theta_2 - \sin\theta_1) \\ &\approx 0.08d\end{aligned} \quad (9)$$

Accordingly, $$d = \Delta d/0.08 \quad (10)$$

From the equation (2) mentioned before, $$d = 3/0.08 \approx 38 \text{ cm} \quad (11)$$

In operation, a predetermined form and level of transmitting power is supplied through the switch 42 from the transmitter 41 to the power divider 44. The power divider 44 divides the transmitting power into a predetermined number of outputs in accordance with a predetermined pattern of distribution whereby vertically fan shaped beams radiate from the antenna arrays 48A and 48B. The outputs from the power divider 44 are phase-shifted in the phase shifter 45 respectively by predetermined shifts corresponding to directivities which are input in the form of 4 bit data into the phase shifter driver 46. The phase-shifted outputs are supplied in a scanning rate to the changeover switch 47 in accordance with the control of the scanning signals from the scanning generator 43. The changeover switch 47 provides the antenna arrays 48A and 48B alternately with the phase shifted outputs in accordance with antenna switching signals from the scanning generator 43. The beams $L_1$ and $L_2$ radiating alternately from the antenna arrays 48A and 48B are received in the aircraft flying at the point Y in the air directly, while the beams $L_3$ and $L_4$ are partially received therein as the beams $L_5$ and $L_6$ after being reflected on the reflecting medium R whereby multipath errors are cancelled in accordance with $\lambda/2$ difference of the indirect beam propagating distances as mentioned before.

In connection with the fourth embodiment as mentioned here, there has been practically used a centerline emphasis microwave landing system in which the sensitivity is emphasized along the center line as compared to the left and right coverage regions to decrease multipath errors. However, there is a disadvantage in the centerline emphasis microwave landing system in that the azimuth coverage region is extremely restricted. On the other hand, such a disadvantage can not be found in the fourth embodiment according to the invention.

Figure 11A:
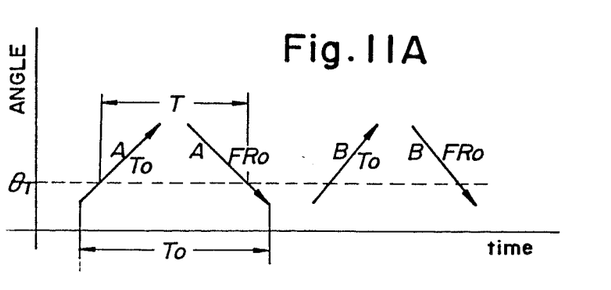
FIGS. 11A to 11C are explanatory diagram showing methods of driving a plural sets of antenna arrays.
Figures 11B, 11C:
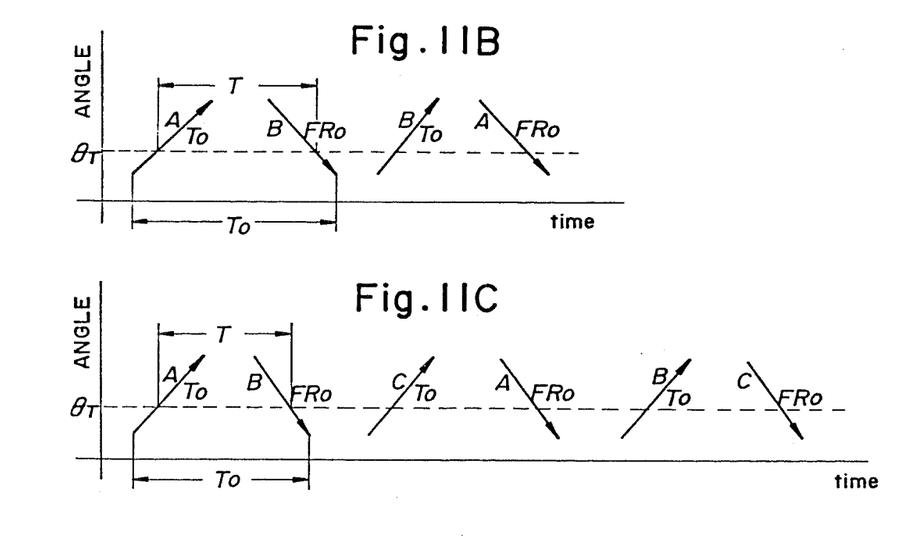

In the first to fourth embodiments, TO and FRO scannings may be conducted in one of the forms as shown in FIGS. 11A to 11C.

In FIG. 11A, TO and FRO scannings of antenna arrays A and those of antenna arrays B are alternately repeated in a predetermined scanning rate whereby glide slope $\theta_T$ can be detected in accordance with a time interval T as mentioned before.

In FIG. 11B, after TO scanning of the antenna arrays A is performed, FRO and TO scannings of the antenna arrays B are performed and FOR scanning of the antenna arrays A is then performed.

In FIG. 11C, there are provided three sets of antenna arrays A, B and C with unequal distances therebetween wherein TO scanning of the antenna arrays A, FRO scanning of the antenna arrays B, TO scanning of the antenna arrays C, FRO scanning of the antenna arrays A, TO scanning of the antenna arrays B, and FRO scanning of the antenna array C are performed in turn. Accordingly, multipath errors are canceled in accordance with non-correlation of multipath propagating beams from the three sets of antenna arrays to an aircraft.

Although the invention has been described with respect to specific embodiment for complete and clear disclosure, the appended claims are not to thus limited but are to be construed as embodying all modification and alternative construction that may occur to one skilled in the art which fairly fall within the basic teaching herein set forth.

What is claimed is:

1. A microwave landing system comprising:
   (a) at least two means for radiating beams alternately to scan a common region in a first direction and a second direction opposite to said first direction;
   (b) means for receiving said radiated beams;
   (c) said at least two radiating means being positioned to be spaced apart by a distance d such that multipath propagating beams caused by reflection of said alternately radiated beams or sidelobes thereof on a ground or a reflecting medium are out of phase or in non-correlation with each other as received in said receiving means;
   (d) said receiving means receiving said alternately radiated beams and said multipath propagating beams and including:
   means for measuring time intervals in accordance with beam peaks of said first and second directions of beams respectively radiated from said at least two radiating means, and
   means for averaging said time intervals to detect an azimuth or elevation angles of said receiving means.

2. A microwave landing system according to claim 1, wherein said at least two radiating means are composed of a single dipole antenna array,
   said single dipole antenna array divided into at least two sections to be alternately driven, and
   said at least two sections spaced at respective radiating centers by said distance d in a vertical direction.

3. A microwave landing system according to claim 1, wherein said at least two radiating means are composed of at least two sets of separate dipole antenna arrays, and said at least two sets of separate dipole antenna arrays spaced at respective radiating centers by said distance d in a vertical direction.

4. A microwave landing system according to claim 1, wherein said at least two radiating means are composed of more than three sets of dipole antenna arrays, and said more than three sets of dipole antenna arrays spaced at respective radiating centers by unequal distances therebetween in the vertical direction.

5. A microwave landing system according to claim 1, wherein said at least two radiating means are composed of at least two sets of dipole antenna arrays, and said at least two sets of dipole antenna arrays spaced apart by said distance d in a horizontal direction.

6. A microwave landing system according to claim 1, wherein said at least two radiating means are composed of more than three sets of dipole antenna arrays, and said more than three sets of dipole antenna arrays spaced apart by unequal distances therebetween in a horizontal direction.

7. A microwave landing system, comprising:

beam radiating unit for radiating beams to scan a predetermined region in a first direction and a second direction opposite to said first direction;

a control unit for driving said beam radiating unit to radiate beams, said beam radiating unit being driven to have one center of radiation selected from at least two centers of radiation alternately, said at least two centers of radiation being positioned to be spaced apart by a distance d in a vertical direction upon detection of an elevation angle or in a horizontal direction upon detection of an azimuth angle such that multipath propagating beams caused by reflection of said beams or sidelobes thereof on a ground or a reflecting medium are out of phase or in non-correlation with each other; and a beam receiving unit provided in an aircraft, said beam receiving unit receiving said beams and said multipath propagating beams; wherein said beam receiving unit includes:

means for measuring time intervals in accordance with beam peaks of said first and second directions of beams radiated from said beam radiating unit having said at least two centers of radiation; and means for averaging said time intervals in order to detect an azimuth or elevation angle of said aircraft.

* * * * *